Figure 1:
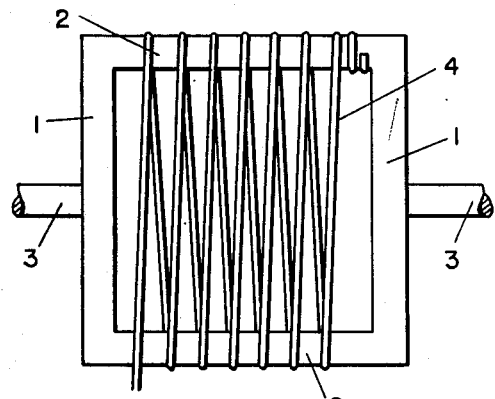

July 29, 1952   R. W. MARTYN   2,605,173
METHOD FOR THE PRODUCTION OF SPINNERETS
Filed Dec. 14, 1949   2 SHEETS—SHEET 1

Inventor
ROGER WILLIAM MARTYN

Cushman, Darby & Cushman
Attorneys

July 29, 1952  R. W. MARTYN  2,605,173
METHOD FOR THE PRODUCTION OF SPINNERETS

Filed Dec. 14, 1949  2 SHEETS—SHEET 2

Inventor
ROGER WILLIAM MARTYN

Cushman, Darby & Cushman
Attorneys

UNITED STATES PATENT OFFICE 2,605,173

METHOD FOR THE PRODUCTION OF SPINNERETS

Roger William Martyn, Largs, Scotland, assignor to Imperial Chemical Industries Limited, a corporation of Great Britain Application December 14, 1949, Serial No. 132,833 In Great Britain March 2, 1949

15 Claims. (Cl. 41—42)

The present invention relates to a method for the production of spinnerets.

The conventional method of spinneret manufacture has been that of punching or drilling holes of the required diameter in thin sheets of noble metal or special alloys. This is an expensive method requiring precision instruments and taking considerable time.

The object of the present invention is to provide a method for the production of plastic spinnerets which will enable such spinnerets to be produced more conveniently and cheaply than hitherto.

According to the present invention the method for the production of plastic spinnerets comprises forming a hollow boxlike structure from a number of rigid frames, preferably of sheet metal, the said structure having layers of spaced substantially parallel wires traversing it from one side to the other and the said layers being separated one from the other, embedding at least a portion of said wires in a liquid convertible into a plastic, converting said liquid into a solid block, cutting said block substantially perpendicularly to the wires into thin plates, and etching out the short wires left in said plates with a liquid which does not affect the plastic.

Examples of liquids convertible into a plastic are heat polymerisable liquid compounds as for instance monomers such as methyl methacrylate and styrene; or thermosetting compositions comprising compounds capable of forming crosslinking resins and a solution of a catalyst therefor in a polymerising solvent as for instance a liquid composition comprising dimethyl acrylic ester of bis ($\beta$ hydroxy ethyl) phthalate, benzoyl peroxide and butyl methacrylate.

In accordance with one embodiment of the invention the hollow boxlike structure can be built up by forming a frame consisting of two end strips connected by two steel side strips and guiding wire progressively from one end to the other of the rotating frame so that the wire is wound on the side strips in the form of a flattened helix. Rectangular sheets with a rectangle cut out of each of them are now placed above and below the windings and a further helix is wound on, the direction of the helix being reversed. These operations are repeated until the required layers of wire have been wound on. A thicker hollow rectangular sheet and a base plate are fixed to one open side of the hollow structure thus produced and a thick hollow rectangular sheet to the other side of the said hollow structure thus producing a box with a series of substantially parallel fine wires traversing it from one side to the other.

The four sides and bottom of the box thus produced are now coated inside and out with a layer of inert matter such as sulphur, to prevent the liquid to be subsequently introduced into the box from leaking away.

The box thus produced is now filled with a liquid which will polymerise on heating, as for example a liquid composition comprising dimethyl acrylic ester of bis($\beta$ hydroxy ethyl) phthalate, benzoyl peroxide and butyl methacrylate; methyl methacrylate; or styrene, and the box containing the liquid is placed in an oven and warmed under carefully controlled conditions to initiate polymerisation of the liquid which gradually becomes solid. When the reaction is complete the block of solidified polymer is removed from the box with the wire still embedded in it by removing the inert matter, severing the wires where these traverse the side strips of the rectangles and removing the latter one by one.

The block is now cut perpendicularly to the wires into thin plates and the short lengths of wires are etched out by means of an acid such as hydrochloric acid which does not affect the polymer, leaving the plates with a series of fine holes in them.

In accordance with another embodiment of the present invention the hollow boxlike structure can be produced from a number of rigid frames preferably of sheet metal, each rigid frame being provided with a wound flattened helix. In this embodiment it is essential to space the thus wound rigid frames by at least one unwound rigid frame. The production of the solid block of plastic material and the subsequent formation of the plastic spinnerets are carried out as described in the first embodiment of the invention.

It may be desirable during the polymerisation of the liquid which will polymerise on heating to supply a source of heat among the wires in the centre of the structure as for instance by insulating a number of wires in the centre from the other wires and from the frame and extending the ends of the insulated wires so as to permit the application of an electric current. This heating of some of the wires during the polymerisation of the said liquid has been found to give the block of solidified polymer a more homogeneous and uniform structure.

The method of the present invention is illustrated by way of example with reference to the diagrammatic drawings accompanying the specification whereof Figs. 1 to 9 illustrate one embodiment of the invention and Fig. 4 and Figs. 6 to 11 illustrate another embodiment of the invention.

Figure 2:
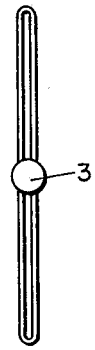
Figure 3:
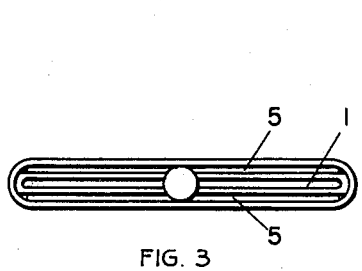
Figure 4:
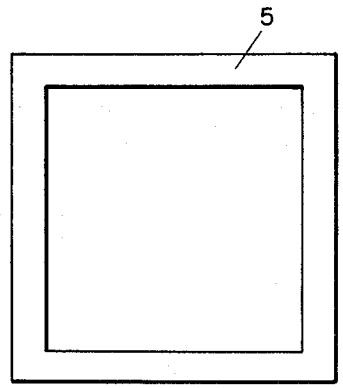
Figure 5:
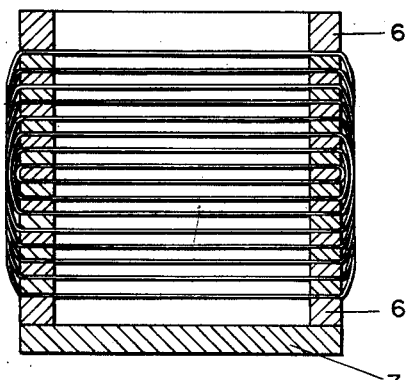
Figure 6:
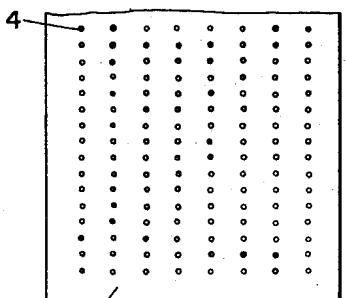
Figure 7:
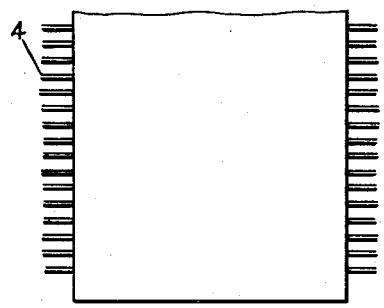
Figure 8:
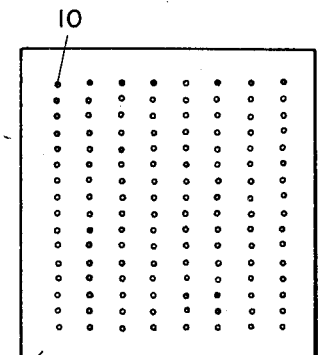
Figure 9:
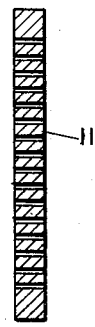
Figure 10:
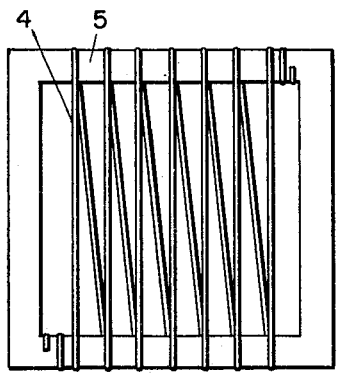
Figure 11:
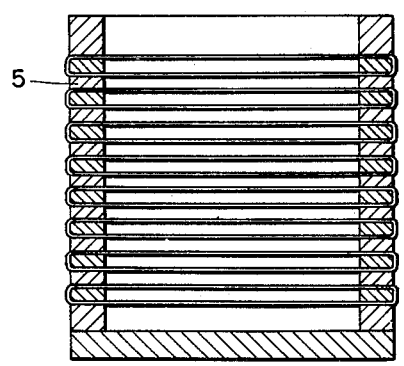

Fig. 1 is a plan view of the frame on which the first helix of wire has been wound and Fig. 2 is an end elevation of the same frame, Fig. 3 is an end elevation after the first pair of hollow rectangular frames has been placed in position and the second helix of wire wound on, Fig. 4 is a plan view of a rigid frame, Fig. 5 is an end section of the completed hollow boxlike structure after the thicker rectangles and the base plate have been fitted, Fig. 6 is a side elevation of a polymerised resin block showing wires embedded therein, Fig. 7 is an end elevation of polymerised block showing the protruding wires at each end after the removal of the superimposed frames of rigid metal, Fig. 8 is a front elevation of a spinneret plate sliced from block and Fig. 9 is a section of a spinneret plate sliced from block, Fig. 10 is a rigid frame wound with a single flattened helix of wire. Fig. 11 is a hollow boxlike structure made up of alternate wound frames (Fig. 10) and unwound frames (Fig. 4) acting as spacers, with thicker rigid frames and base plate fitted.

In accordance with the first embodiment of the invention and with reference to Figs. 1 to 8 a frame consisting of two end strips 1 connected by two steel side strips 2 is mounted in a winding machine by means of the two journals 3. The end of a length of wire of gauge 43 on a reel is attached to one of the side strips and the frame is rotated about its journals, the wire being guided progressively from one end of the frame to the other so that the wire is wound to the side strips in the form of a flattened helix 4. Rectangular sheets 5 with a rectangle cut out of them are now placed above and below the windings and a further helix is wound on, the direction of the helix being reversed by reversing the movement of the wire guide.

These operations are repeated until the required layers of wire have been wound on. Two thick rectangular sheets 6 are now placed in position as illustrated and base plate 7 is fixed to one open end of the frame thus producing an open box with a series of fine wires traversing it from one side to the other.

The four sides and bottom of the box are now coated with a layer of inert matter such as molten sulphur which is thereupon allowed to solidify to prevent liquid, which is subsequently introduced into the box, from leaking away. Into the box is now poured a liquid resin such as a composition comprising dimethyl acrylic ester of bis($\beta$ hydroxy ethyl) phthalate, benzoyl peroxide and butyl methacrylate which will polymerise when heated. The solid resin formed will exactly conform to the shape of the box and wires. The box containing its charge of liquid resin is placed in an oven and warmed under carefully controlled conditions to initiate polymerisation of the resin which gradually becomes solid. When the reaction is complete the block of solidified polymer 8 is removed from the box with the wires 4 still embedded in it. This is effected by removing the rectangular plate 6 and base 7 and, after severing the wires where they traverse the sides of the rectangles, removing the latter one by one, finally lifting the block clear of the first frame.

The block 8 is now cut perpendicularly to the wires into thin plates 9 as shown in Fig. 8 and the short wires 10 are etched out by means of an acid such as hydrochloric acid which does not affect the polymer, leaving the plates with a series of fine holes 11 in them.

Referring to the second embodiment of the invention and Fig. 4 and Figs. 6 to 11, the rigid frames 5 are each mounted in the winding machine and a flattened helix of wire 4 wound on each frame separately. The frames are now placed one above the the other but spaced apart by an unwound rigid frame 5 to form a hollow boxlike structure. After the addition of the thickened frames 6 and the base plate 7 the operations are as described in the first embodiment.

I claim:

1. A method for the production of plastic spinnerets which comprises forming a hollow boxlike structure from a number of rigid frames set one atop the other, said boxlike structure having positioned therein spaced apart layers of substantially parallel wires traversing said structure from one side to the other in the form of flattened helixes, casting a solidifiable resin composition selected from the group consisting of thermoplastic and thermosetting resin compositions, in said boxlike structure to embed at least a portion of said wires in said cast resin, converting said cast resin into a solid block, cutting said block substantially perpendicularly to the wires into thin plates having short wires embedded therein and thereafter etching out the short wires in said plates with a liquid which does not affect the plastic.

2. A method as claimed in claim 1 wherein the rigid frames are of sheet metal.

3. A method as claimed in claim 1 wherein the hollow boxlike structure is built up by forming a frame consisting of two end strips connected by two steel side strips, rotating said frame and progressively guiding wire from one end to the other of said rotating frame so that the wire is wound on the side strips in the form of a flattened helix, placing above and below the windings rectangular sheets with a rectangle cut out of each of them, winding a further helix but in the reverse direction, repeating these operations until the required layers of wire have been wound, and fixing a thicker hollow rectangular sheet and a base plate to one open side of the hollow structure thus produced and a thick hollow rectangular sheet to the other side of the said hollow structure.

4. A method as claimed in claim 1 wherein the hollow boxlike structure is produced from a number of rigid frames, each rigid frame being provided with a wound flattened helix, and spacing the thus wound rigid frames by at least one unwound rigid frame, and fixing a thicker hollow rectangular sheet and a base plate to one open side of the hollow structure thus produced and a thick hollow rectangular sheet to the other side of the said hollow structure.

5. A method as claimed in claim 1 wherein a source of heat is supplied among the wires in the centre of the structure during the solidification of the cast resin composition.

6. A method as claimed in claim 5 wherein the said wires in the centre of the structure are insulated from the other wires and from the frame and their ends are extended so as to permit the application of an electric current.

7. A method as claimed in claim 1 wherein the block of solidified polymer ultimately produced is removed from the boxlike structure with the wire still embedded in it by removing the inert matter, severing the wires where these traverse the side strips of the frames and removing the latter one by one.

8. A method as claimed in claim 7 wherein the block thus removed is cut perpendicularly to the wires into thin plates and the short lengths of wires in the thin plates are etched out by means of an acid which does not affect the polymer thereby leaving the plates with a series of fine holes in them.

9. A method as claimed in claim 1 wherein said cast solidifiable resin composition is a thermoplastic heat-polymerizable liquid resin.

10. A method as claimed in claim 1 wherein said cast solidifiable resin is a thermosetting resin composition, said composition comprising a compound capable of forming a cross-linking resin in a solution of a catalyst therefor in a polymerizing solvent.

11. A method as claimed in claim 1 wherein said cast solidifiable resin composition is methyl methacrylate.

12. A method as claimed in claim 1 wherein said cast solidifiable resin composition is styrene.

13. A method as claimed in claim 1 wherein said cast solidifiable resin composition is one comprising dimethyl acrylic ester of bis($\beta$ hydroxy ethyl) phthalate, benzoyl peroxide and butyl methacrylate.

14. A method as claimed in claim 1 wherein the hollow boxlike structure is coated inside and out with a layer of inert material which prevents the resin composition subsequently cast into the boxlike structure from leaking through the same.

15. A method as claimed in claim 14 wherein the layer of inert matter is sulphur.

ROGER WILLIAM MARTYN.

REFERENCES CITED

The following references are of record in the file of this patent:

UNITED STATES PATENTS

| Number | Name | Date |
|---|---|---|
| 1,195,949 | Carney | Aug. 22, 1916 |
| 1,654,936 | Jones | Jan. 3, 1928 |
| 2,156,156 | Mahlck | Apr. 25, 1939 |
| 2,476,455 | Roush | July 19, 1949 |
| 2,499,577 | Fine et al. | Mar. 7, 1950 |